United States Patent [19]

Kassatly

[11] Patent Number: 4,975,771

[45] Date of Patent: Dec. 4, 1990

[54] METHOD AND APPARATUS FOR TV BROADCASTING

[76] Inventor: Salim A. Kassatly, P.O. Box: 550, Brush Prairie, Wash. 98606

[21] Appl. No.: 457,403

[22] Filed: Dec. 18, 1989

Related U.S. Application Data

[63] Continuation-in-part of Ser. No. 308,826, Feb. 2, 1989, Pat. No. 4,903,126.

[51] Int. Cl.$^5$ .............................................. H04N 7/08
[52] U.S. Cl. ..................................... 358/146; 358/86; 358/142; 358/181; 370/109; 370/118; 455/3; 455/69; 455/88
[58] Field of Search ................. 358/86, 142, 146, 181; 455/3, 69, 88; 370/109, 118

[56] References Cited

U.S. PATENT DOCUMENTS

| | | | |
|---|---|---|---|
| 3,213,201 | 10/1965 | Flood et al. | 220/301 |
| 3,693,090 | 8/1969 | Gabriel | 325/308 |
| 3,733,430 | 5/1973 | Thompson et al. | 178/5.1 |
| 4,215,370 | 7/1980 | Kirk | 358/142 |
| 4,450,477 | 5/1984 | Lovett | 358/142 |
| 4,467,356 | 8/1984 | McCoy | 358/146 |
| 4,689,661 | 8/1987 | Barbieri et al. | 358/12 |
| 4,896,209 | 1/1990 | Matsuzaki et al. | 358/86 |
| 4,903,126 | 2/1990 | Kassatly | 358/142 |

FOREIGN PATENT DOCUMENTS

| | | | |
|---|---|---|---|
| 0212261 | 3/1987 | European Patent | H04N 7/13 |
| 3146468 | 6/1983 | Germany | H04B 9/00 |

OTHER PUBLICATIONS

JOURNAL ON SELECTED AREAS IN COMMUNICATIONS, IEEE Vol-SAC-5, No. 4, May 1987 (New York, USA) Y.-S. KAO et al.: "Time-multiplexed analog transmission of three broadcast-quality television channels through one satellite transponder" pages 676-684

Primary Examiner—John W. Shepperd
Assistant Examiner—Michael D. Parker
Attorney, Agent, or Firm—S. A. Kassatly

[57] ABSTRACT

A video broadcasting method and apparatus. The broadcasting method generally includes the steps of selecting one or more channels from a plurality of available channels, and scanning the selected channels for generating signals identifying these selected channels. The channel identifying signals are then fed back to a transmitter unit over a first carrier frequency. The feedback signals are used to selectively identify the channels to be transmitted. The signals from the selected channels are compressed, multiplexed and transmitted over a second carrier frequency to a reception unit, where the signals are demultiplexed and separated into separate channels, and stored for a predetermined period of time. The separated signals are then decompressed, reconstructed and displayed on a real-time basis.

7 Claims, 7 Drawing Sheets

METHOD AND APPARATUS FOR TV BROADCASTING

CROSS REFERENCE TO RELATED APPLICATION

This is a continuation in part of application Ser. No. 308,826, filed Feb. 2, 1989, U.S. Pat. No. 4,903,126.

BACKGROUND OF THE INVENTION

1. Technical Field

The present invention relates in general to telecommunications systems such as television and TV cable broadcasting. It more particularly relates to a method and apparatus for an efficient video broadcasting.

2. Background Information.

Conventional Television and TV cable broadcasting is generally carried out on a real-time basis. For instance, it takes the same length of time to broadcast or transmit a TV program than it does to receive and display the program. Such broadcasting method has proven to be less than completely desirable due to limited TV bandwidth and channels allocation therein.

Channel availability has been a crucial limitation in the broadcasting industry. Channel allocation has been very valuable and expensive. It has precluded several interested persons, small businesses, consumers and local community chapters from accessing the TV broadcasting networks.

TV broadcasting has become the single most important and popular means for accessing and educating large numbers of citizens. Therefore, TV broadcasting has a direct effect on the right to free speech and expression as guaranteed by several constitutions around the world, including that of the United States of America.

Research and development has been carried out in the TV and video broadcasting field. The following patents exemplify the state of the art in the relevant field:

1. U.S. Pat. No. 4,215,369 by Ijima, entitled "Digital Transmission System for Television Video Signals", and assigned to Nippon Electric Co.

2. U.S. Pat. No. 4,300,161 by Haskell, entitled "Time Compression Multiplexing of Video Signals", and assigned to Bell Telephone Laboratories, Incorporated.

3. U.S. Pat. No. 4,410,980 by Takasaki, entitled "Time Division Multiplexing System", and assigned to Hitachi, Ltd.

4. U.S. Pat. No. 4,533,936 by Tiemann, entitled "System for Encoding and Decoding Video Signals", and assigned to General Electric Co.

5. U.S. Pat. No. 4,593,318 by Eng, entitled "Technique for the Time Compression Multiplexing of Three Television Signals", and assigned to AT&T Bell Laboratories.

6. U.S. Pat. No. 4,646,135 by Eichelberger, entitled "System for Allowing Two Television Programs Simultaneously to Use the Normal Bandwidth for One Program by Chrominance Time Compression and Luminance Bandwidth Reduction", and assigned to General Electric Co.

The United States Department of Defense has sponsored several projects relating to the field of the present invention. The following Defense Technical Information Center (DTIC) technical reports exemplify some of these projects:

1. AD-A206 140, entitled "Investigation of Optional Compression Techniques for Dither Coding".

2. AD-A210 974, entitled "Robot Vehicle Video Image Compression".

3. AD-A191 577, entitled "Narrative Compression Coding for a Channel with Errors".

4. AD-A194 681, entitled "SNAP/DDN Interface for Information Exchange".

5. AD-A174 316, entitled "A Packet Communication Network Synthesis and Analysis System".

6. AD-A206 999, entitled "Geometric Methods with Application to Robust Detection and Estimation".

7. AD-A207 814, entitled "Random Transform Analysis of a Probabilistic Method for Image Generation".

8. AD-A188 293, entitled "A Video-Rate CCD Two-Dimensional Cosine Transform Processor".

9. AD-A198 390, entitled "Navy Satellite Communications in the Hellenic Environment".

Wherefore, it would be highly desirable to have a new and improved method and apparatus for increasing channel availability and for rendering the channel allocation process more efficient. The new method and apparatus should be relatively simple and inexpensive to implement and to place into effect. The new method and apparatus should also be capable of being implemented with new as well as existing television sets.

SUMMARY OF THE INVENTION

Therefore, it is an object of the present invention to address the concerns associated with conventional broadcasting systems, and to provide adequate solutions thereto.

Briefly, the above and further objects and features of the present invention are realized by providing a new and improved video broadcasting method and apparatus. The broadcasting method comprises the step of compressing and multiplexing signals from a plurality of channels over a single carrier frequency.

The multiplexed signals are then transmitted in a packet form to a reception circuit. The multiplexed signals are demultiplexed at the reception circuit, and the demultiplexed signals are then separated into separate channels, and stored for a predetermined period of time.

When a desired channel is selected, only the signals of that selected channel are decompressed and reconstructed on a real-time basis. The video broadcasting apparatus scans all the channels and determines which and whether a particular channel has been selected. If the particular channel has not been selected, then the stored signals for that particular channel are automatically erased in preparation for storage of the next signals.

If the particular channel has been selected, then only the signals of that channel are decompressed, reconstructed and displayed on a real-time basis. The decompressed signals are then automatically erased in preparation for storage of the next demultiplexed signals.

THEREFORE, the inventive method and apparatus for TV or video broadcasting increase channel availability and render the channel allocation process more efficient. The new method and apparatus are relatively simple and inexpensive to implement. The new method and apparatus can be implemented with new as well as existing television sets. Additionally, the new apparatus can be used to prevent copying and taping of generally copyrighted programs.

Furthermore, the new method and apparatus have broad military applications as well as commercial applications. For instance, the inventive broadcasting method and apparatus will provide substantial practical improvements to the U.S. Navy's Telecommunications Systems (NTS), and could be used in satellite communications, and sub-marine imaging In addition to the military applications, the inventive television broadcasting method and apparatus have versatile commercial applications, such as regular television, high definition TV (HDTV), as well as interactive television and video systems.

BRIEF DESCRIPTION OF THE DRAWINGS

The above and other features of the present invention and the manner of attaining them, will become apparent, and the invention itself will be best understood, by reference to the following description and the accompanying drawings, wherein.

DESCRIPTION OF THE PREFERRED EMBODIMENT

Figure 1:
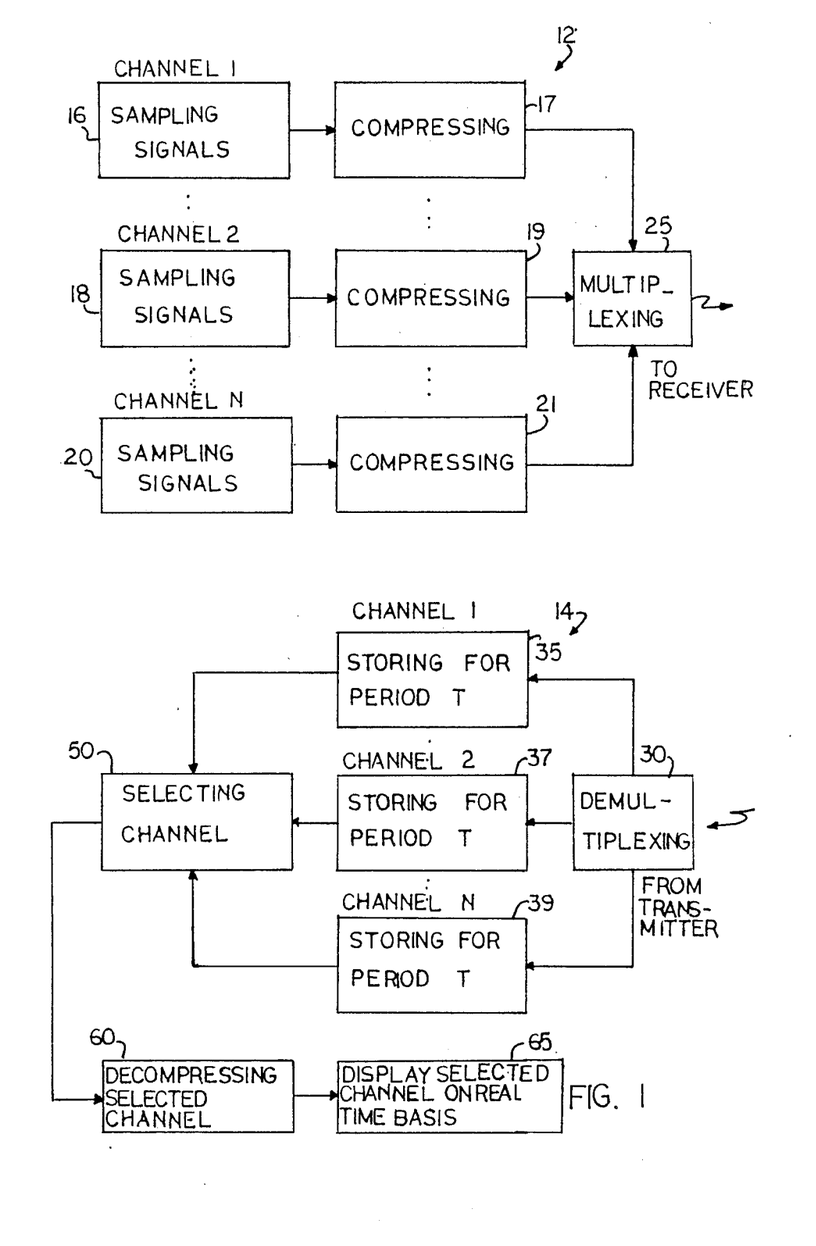
FIG. 1 is a block diagram of a method for broadcasting and receiving TV signals according to the present invention.

Referring now to the drawings, and more particularly to FIG. 1 thereof, there is illustrated a flow chart of a method 10 for broadcasting and receiving TV or video signals according to the present invention. The method 10 generally comprises a process 12 for processing signals to be transmitted, and a process 14 for processing the received signals.

In conventional television or video broadcasting systems the channels 1 through n are received and then displayed on a real time basis as corresponding channels 1 through n. These channels generally occupy the entire bandwidth at the receiver end. Thus, the channel availability in conventional broadcasting systems is severely limited by the allocated TV bandwidth. In most instances, this bandwidth is fixed or limited, and thus not expandable. Since each one of the received channels also generally have fixed bandwidths, the number of channels cannot be increased.

Wherefore, the present broadcasting method 10 (FIG. 1) and apparatus 200 (FIG. 3) offer a valuable advantage over the conventional methods and apparatus, in that the present method and apparatus enable the accommodation of a substantially larger number of channels in the limited TV bandwidth of the receiver.

The transmission process 12 generally includes multiplexing signals from a plurality of channels 1, 2, through n, prior to transmission. The multiplexed signals are then transmitted over a single base frequency. The channels 1 through n generally occupy the entire allocated television or video bandwidth.

The reception process 14 generally includes demultiplexing the transmitted signals, storing the received signals for a predetermined period of time T, and then displaying only the selected channel, on a screen.

Figure 4:
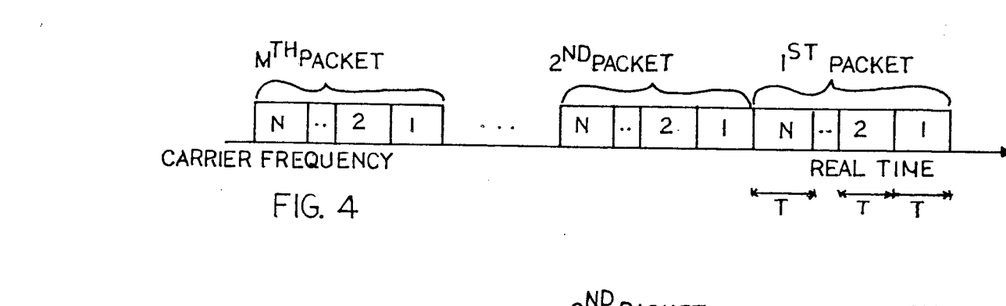
FIG. 4 is diagrammatic representation of the real-time signal processing at the output of a transmitter circuit which forms a part of the apparatus of FIG. 3.

Considering now the transmission process 12 in greater in detail, with respect to FIGS. 1 and 4, it includes sampling the signals of a first channel 1 as indicated at 16, for a predetermined period of time T. The sampled signals are then compressed at 17.

The signals of each one of the remaining channels 2 through n are processed similarly to channel 1, as indicated at 18, 19, 20 and 21. The multiplexing of the signals from all the channels 1 through n are then multiplexed at 25 in the form of successive packets FIG. 4 illustrates the real-time multiplexing of the signals from all the channels 1 through n.

Figure 5:
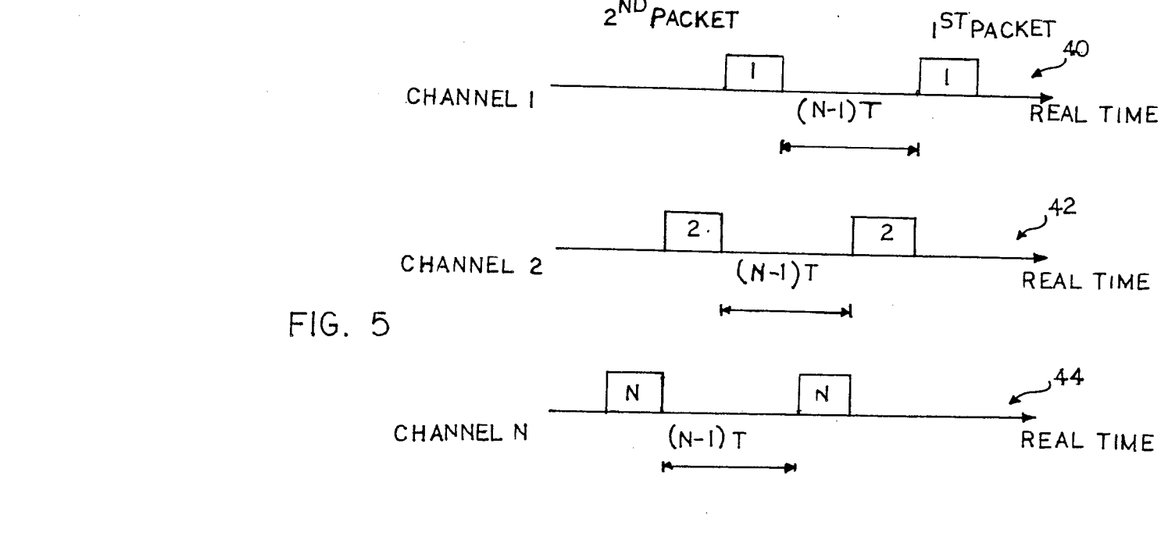
FIG. 5 is a diagrammatic representation of the real-time signal processing at the input of a receiver circuit which forms a part of the apparatus of FIG. 3.

Returning now to FIG. 1, the reception process 14 includes receiving the multiplexed signals and then demultiplexing the same at 30 into the same number of separate channels 1 through n. The signals are then independently stored as indicated at 35, 37 and 39 in FIG. 1, and at 40, 42 and 44 in FIG. 5.

Once a particular channel, such as channel 2 is selected at 50 (FIG. 1) only the signals of that particular channel are displayed on a real time basis. However, since the last compressed signals in a packet, such as the first packet, for each channel, such as channel 2, are separated from the beginning of the compressed signals in the next packet, by (n-1) T, it is important to serially display the information contained in successive packets to avoid a non-continuous display of signals.

For this purpose, a processor or computer (not shown) at the receiving end decompresses the signals of the selected channel at 60, and reconstructs the initial real-time signals. Simultaneously, the processor expands the real time spread of the restored signals over a period of T, thus bridging the (n-1)T time between two successive packets. The restored signals are then displayed at 65.

At present, a major limitation to the period T is the limitation on the storage memory. However it should be understood that with the increased availability of expanded memory capacity, the period T will, in the future, be capable of being increased as required by the particular applications.

Figure 2:
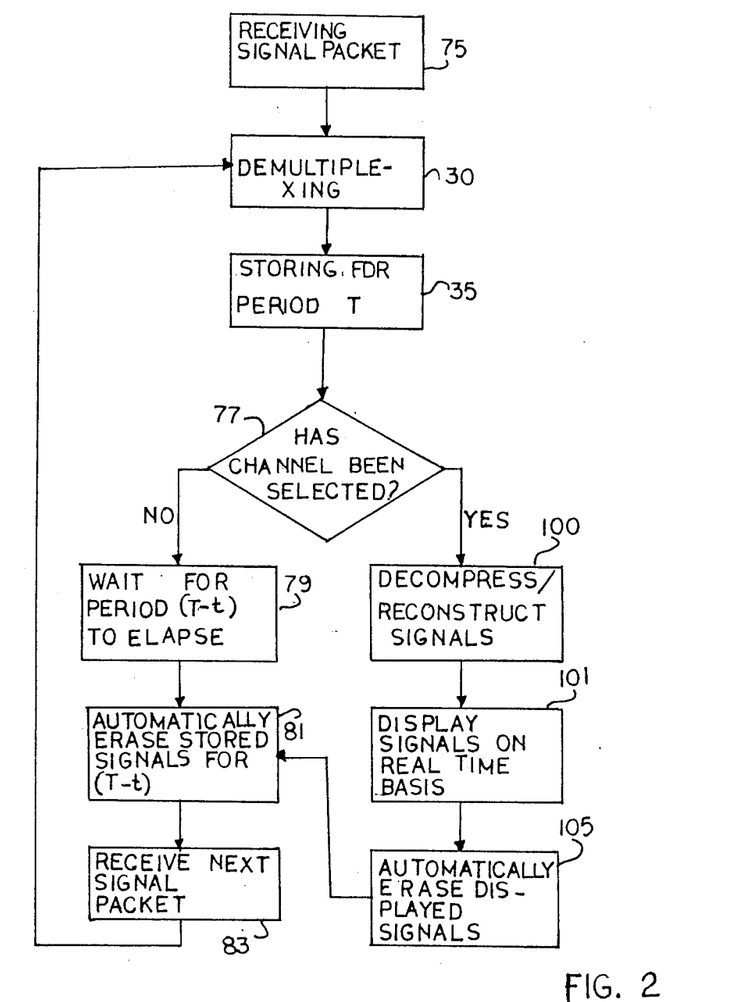
FIG. 2 is a flow chart further detailing the method for broadcasting of FIG. 1.

Considering now FIG. 2 in greater detail, it generally illustrates a flow chart further detailing the reception process of the signals for each individual channel such as channel 1. Such process is carried out by a software program at the receiving end or TV set.

The compressed signals are first received at 75, at the input of a demultiplexer 105 (FIG. 3) in the form of a packet of signals from various channels. The received signals are then demultiplexed at 30, and the demultiplexed signals are then stored for a predetermined period of time T, and for each channel separately from the others, as indicated at 35, 37 and 39 in FIG. 1.

The software then determines at 77 whether that particular channel has been selected. If it has not been selected, then the software waits at 79 for a period (T-t)

to elapse; where "t" is defined as a relatively small incremental period compared to the period T.

Figure 3:
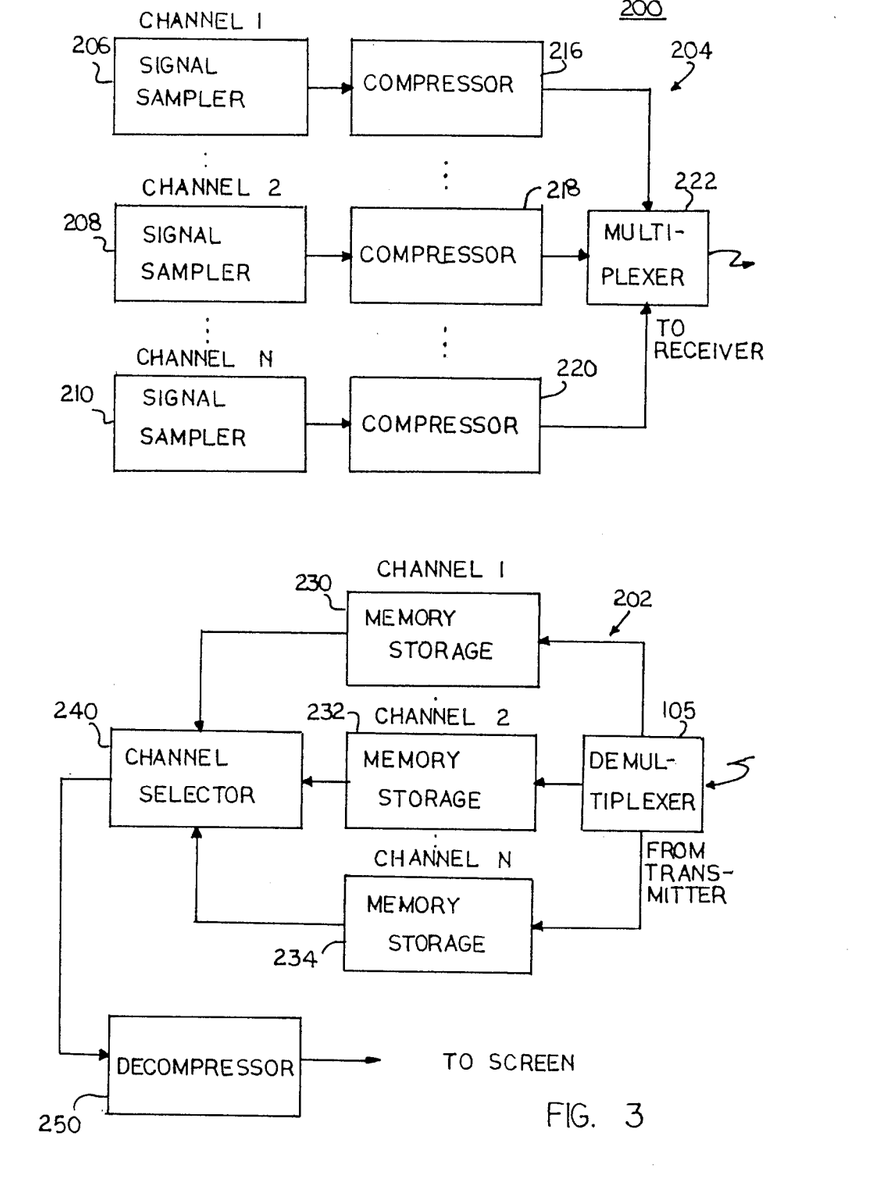
FIG. 3 is a block diagram of a TV broadcasting and reception apparatus which is constructed in accordance with the present invention, for implementing the broadcasting process of FIG. 1.

At the end of the time period (T-t), the software automatically erases the signals stored of the elapsed period (T-t), at 81. The time period t allows the signals from the next packet to replace the erased signals which are received by the demultiplexer 105. Thus, the period t can be substantially smaller than T, and for certain applications, the period t can be so negligible that it can be ignored totally.

The signals from the next packet are then received at 83, and the cycle of multiplexing and storing the signals is then repeated.

If the software determines that the particular channel has been selected by the user or TV viewer, then the stored signals for that particular channel are decompressed and restored at 100, in the manner described above.

The reconstructed signals are then displayed on a real-time basis at 101. Thus, instead of using real-time transmission of the signals, the signals can now be transmitted in a compressed form, thereby clearing precious channel space and increasing channel availability, and the real-time signal reconstruction is carried out at the user's level without excessive cost.

The signals which have been displayed are automatically erased from the storage memory at 105. Once the signals are reconstructed at 100 the previously stored compressed signals are automatically erased at 81, and the cycle of multiplexing and storing the signals is then duplicated.

Referring now to FIG. 3, there is illustrated a block diagram of a TV broadcasting and reception apparatus 200 which is constructed in accordance with the present invention and which performs the steps of the process 10, as illustrated in FIGS. 1 and 2.

In operation, the user simply connects the reception circuit 202 of the apparatus 200 between his or her antenna or cable outlet and the conventional TV set, and operates his or her TV set as usual.

The apparatus 200 also serves another important function, namely to prevent copying or taping of the TV programs. This is accomplished by incorporating the reception circuit 202 inside the TV set, invisibly from the user, thereby preventing access to the reconstructed signals.

The apparatus 200 generally includes a transmission circuit 204 and the reception circuit 202. While the components used in the apparatus 200 are conventional parts, generally known and available in the electronics industry, it should be understood that the general architecture of the apparatus 200, including the combination of its components for producing the desired results, features and advantages is new.

The transmission circuit 204 generally includes a signal sampler 206, 208 and 210 for each one of the channels 1 through n respectively. It further includes a separate compression circuit 216, 218 and 220 for each one of the channels 1 through n. The compressed signals are then fed to a multiplexer 222, and are transmitted to the reception circuit 202.

The reception circuit 202 generally includes a demultiplexer 105 which separates the incoming signals into their respective separate channels. The demultiplexed signals are then stored in a separate memory storage 230, 232 or 234, for each one of the channels 1 through n.

A conventional channel selector 240 enables the user to select the channel he or she wishes to view. A decompressor 250 decompresses and reconstructs only those signals on the selected channel, which signals are then displayed on a screen or monitor (not shown).

An alternative embodiment of the present invention will now be described in conjunction with FIGS. 6, 7 and 8. The numeral references in FIGS. 6, 7 and 8 connote the same or substantially similar elements or processes to those in FIGS. 1, 2 and 3.

The alternative embodiment has several military and commercial applications. For instance, the inventive alternative broadcasting method 12 (FIGS. 6, 7) and apparatus 200 (FIG. 8) will provide substantial practical improvements to the United States Navy Telecommunications Systems (NTS), satellite communications, and sub-marine imaging.

In addition to the military applications, the inventive alternative broadcasting method and apparatus have versatile commercial applications, such as regular television, high definition TV (HDTV), as well as interactive television and educational video systems.

Figure 6:
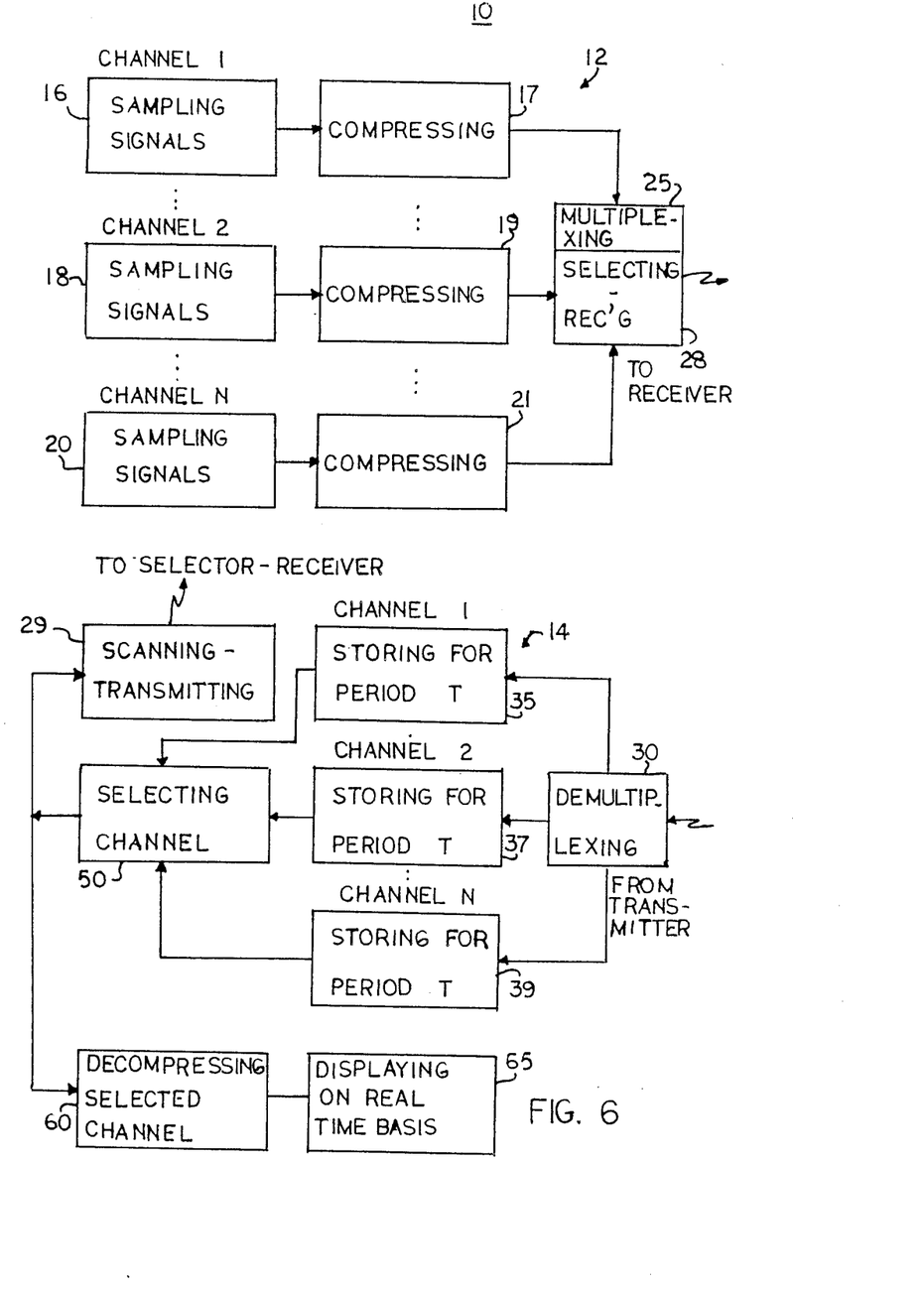
FIG. 6 is a block diagram of another method for broadcasting and receiving TV signals according to the present invention.
Figure 8:
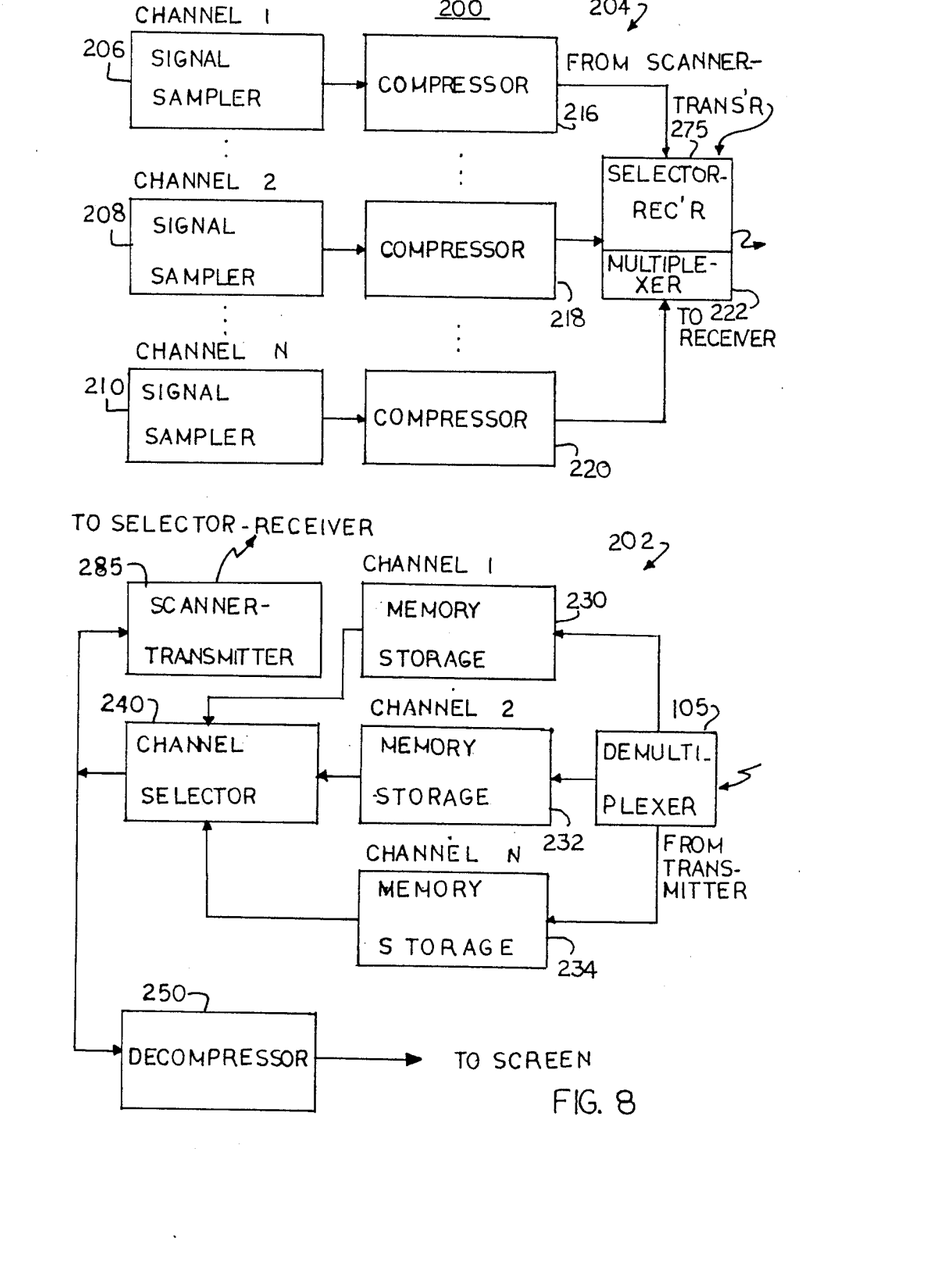
FIG. 8 is a block diagram of another TV broadcasting and reception apparatus which is constructed in accordance with the present invention, for implementing the broadcasting process of FIG. 6.

The alternate broadcasting method 12 of FIG. 6 includes identifying the channels that have been selected by the user at the receiver level 202, and then feeding this information back to the transmitter 204 (FIG. 8). This selection information is valuable in further enhancing the broadcasting process, in that the selection information is used to select which of the channels 1 through n will be transmitted.

Hence, instead of transmitting all the channels 1 through n, only those channels which the user wishes to view are selected and then transmitted. In this manner, the efficiency of the preferred broadcasting method illustrated in FIG. 1 is substantially improved.

Let us take a hypothetical example to illustrate the improvements presented by the alternate embodiment. If for instance 50 channels can be transmitted over a conventional television bandwidth, the preferred embodiment will allow the transmission of at least 100 channels, while the alternate embodiment will permit the selective transmission of over 200 channels.

It is preferable to use the alternate broadcasting method and apparatus in special applications such as satellite communications and interactive video, where the number of selected channels is limited. In case of public broadcasting, such as in regular televisions, where all or most of the channels are simultaneously selected by the viewers, the preferred embodiment of the broadcasting apparatus could be used instead.

In specialized applications however, the alternate broadcasting method and apparatus offer substantial additional advantages. Let us consider for instance satellite communications where the selection process is done periodically, automatically or selectively, the delay time t can be designed to correspond to the time it takes the feedback signal to be transmitted to, and reach the satellite so that the processor or computer on board the satellite can select the channels to be transmitted, and then transmit these channels to the exclusion of the channels that have not been selected.

In such application, video cameras can be installed in a matrix format at almost any angle around the satellite, thus capturing a three dimensional view of the surrounding space. If it is therefore desired to view selected space sectors within certain desired angles, the viewer at the receive end simply programs the channel selector 240 to select only those video cameras or channels within the matrix of the desired viewing angles. In this manner, only the space sectors within the desired angles will be viewed.

Similarly, if the alternate broadcasting apparatus and method are used in interactive or educational video, where the viewer has to option to select from a broad range of options, then the viewer can make a selection of his or her choices, these choices are then forwarded to the transmitter and the selected choices are then displayed, while the non-selected choices would not be transmitted or displayed.

Yet another application of the alternate apparatus and method is in video recorders or VCRS, for recording multiple channels. In which case both the transmitter 204 and the receiver 202 are incorporated as part of the VCR circuitry at the user's level. When it is desired to record more than one channel, the user simply stores his or her channel selection using the channel selector 240. A scanner-transmitter 285 identifies the selected channels and transmits them via an electrical or light (i.e. infra-red) connection to a selector-receiver 275. The selector-receiver 275 then issues a command to the signal samplers (i.e. 206, 208 and 210) for the selected channels. The signal samplers are connected to a UHF-VHF antenna (not shown) for receiving the transmitted television signals. The signals from the selected signal samplers are then compressed by the compressors (i.e. 216, 218 and 220) and then multiplexed by the multiplexer 222.

The multiplexed signals could then be recorded on regular video tapes in a compressed form, or for a better performance, these signals could be digitized and stored on tapes or in a computer memory for later retrieval. When the user wishes to view the recorded programs, he or she selects the particular channel to be viewed with the channel selector 240.

The scanner-transmitter 285 then issues a command to the selector-receiver 275 for transmitting only the selected channel to be viewed on a real-time-basis. The demultiplexer 105 then demultiplexes only that particular selected channel and transmits its signals to the corresponding memory storage (i.e. 230). The memory storage stores the signal for a period of n.(T-1) if the compressed signals of the selected channels have substantially similar sampling period or for a period substantially equal to $$\sum_{i=2}^{n}$$

Ti if the compressed signals of the selected channels do not have substantially similar sampling periods wherein n represents the number of channels that have been originally recorded or selected stored on tape or memory and T or Ti represent the sampling periods of the compressed signals over the selected channels.

As illustrated in FIG. 4, the intermittent storage of the signals from the same channel is important for providing a continuous uninterrupted viewing of the signals. For instance, if the viewer wishes to record three channels, and the sampled signals from the first channel occupy a time slot T (FIG. 4), the memory storage delays the transmission of the first packet signals by a period of "3.T", until the signals from the second packet are processed. In which case, the signals from each one of the packets restored on a real-time-basis, thus achieving a continuous. uninterrupted flow of signals.

The above application can also be used in collecting data, voice, light and video signals from individual transmitter units and channel or "network" them to a single or multiple outputs. One such applications could be used in fast food restaurants or other similar restaurants, where multiple customers can place or select their orders. These orders are then distributed to various food preparers for service.

In this application, the users of the system are the patrons or customers of the restaurant, and the viewers are the food preparers who are located at a remote location from the users, and the system 200 would include a transmitter unit 204 and a plurality of substantially similar reception units or receptors 202. Some of these receptors 202 are allocated to the users and others are allocated to the viewers.

In this manner, the users or customers use the channel selector 240 to make their food selection, while the viewers or food preparers use the channel selectors 240 to view the orders. The users can then make multiple food selections while the food preparers view only their own specialized orders and identify these orders with particular customers who placed the orders Therefore, communication between the customers and the food preparers is substantially enhanced.

Figure 7:
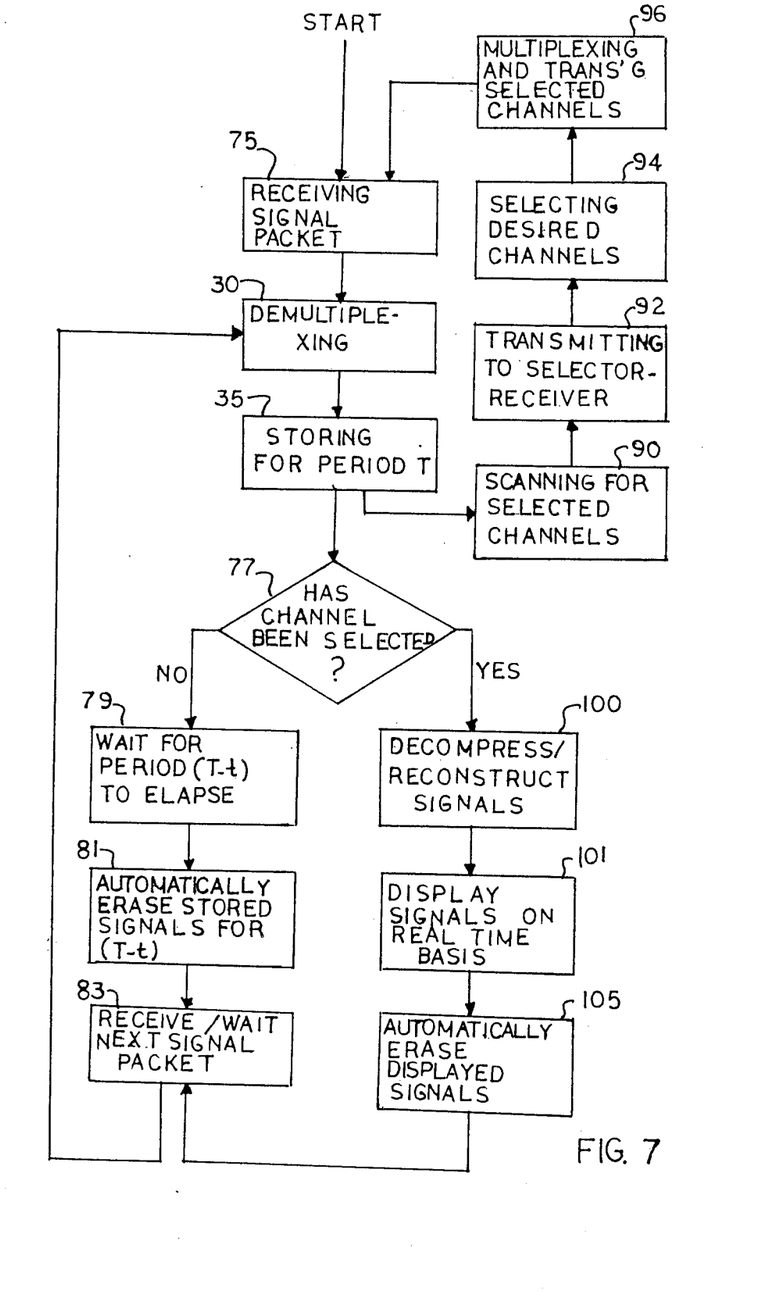
FIG. 7 is a flow chart further detailing the method for broadcasting of FIG. 6.

The alternate method 12 is illustrated in more detail in FIGS. 6 and 7. It is substantially similar to the method of the preferred embodiment, with the exception that the alternate method 12 includes the step of scanning 29 the selection process of the channels after they have been selected at 50 at the receiver level 202 (FIG. 8). Information on the selected channel, such as which channel has or has not been selected by the user, is then fed back to the transmitter 204 (FIG. 8).

The feedback process can be done in any conventional transmission method, such as over a radio or light frequencies. Lasers and infra-red transmissions can also be used. The frequency of transmission should however be selected in such a way as not to interfere with the simultaneous video transmission.

While particular embodiments of the present invention have been disclosed, it is to be understood that various different modifications are possible and are contemplated within the scope of the specification, drawings, abstract and appended claims.

What is claimed is:

1. A video broadcasting method comprising the steps of:
    (a) selecting one or more channels from a plurality of available channels;
    (b) scanning said selected channels for generating signals identifying said selected channels;
    (c) feeding back said channel identifying signals to a transmitting means over a first carrier frequency;
    (d) using said feedback signals for selectively identifying the channels to be transmitted;
    (e) compressing and multiplexing signals from said selected channels over a second carrier frequency;
    (f) transmitting only said multiplexed signals;
    (g) receiving said multiplexed signals;
    (h) demultiplexing and separating said received signals into separate channels;
    (i) storing the separated signals for a predetermined period of time;
    (j) decompressing and reconstructing the signals of the selected channel on a real-time basis; and
    (k) displaying the reconstructed signals of the selected channel on a real-time basis.

2. The method as defined in claim 1 further wherein said step of storing includes the step of storing said separated channels for a period of n.(T-1) if the compressed signals of the selected channels have substantially similar sampling periods, where n represents the number of channels that have been initially selected by a user, and T represents the sampling period of the compressed signals over one channel.

3. The method as defined in claim 1 further wherein said step of storing includes the step of storing said separated channels for a period substantially equal to $$\sum_{i=2}^{n} T_i,$$

if the compressed signals of the selected channels do not have substantially similar sampling periods, where n represents the number of channels that have been initially selected by a user, and Ti represents the sampling periods of the compressed signals over the selected channels.

4. A video broadcasting apparatus comprising:
   (a) first means for selecting one or more channels from a plurality of available channels;
   (b) means for scanning said selected channels to generate signals identifying said selected channels;
   (c) means for feeding back said channel identifying signals to a transmitting means over a first carrier frequency;
   (d) means for using said feedback signals to selectively identify the channels to be transmitted;
   (e) means for compressing and multiplexing signals from said selected channels over a second carrier frequency;
   (f) for transmitting only said multiplexed signals;
   (g) first means for receiving said multiplexed signals;
   (h) first means for demultiplexing and separating said received signals into separate channels;
   (i) first means for storing the separated signals for a predetermined period of time;
   (j) first means for decompressing and reconstructing the signals of the selected channel on a real-time basis; and
   (k) first means for displaying the reconstructed signals of the selected channel on a real-time basis.

5. The apparatus as defined in claim 4 further including:
   (a) second means for selecting one or more channels from a plurality of available channels;
   (b) second means for receiving said multiplexed signals;
   (c) second means for demultiplexing and separating said received signals into separate channels;
   (d) second means for storing the separated signals for a predetermined period of time.;
   (e) second means for decompressing and reconstructing the signals of the selected channel on a real-time basis; and
   (f) second means for displaying the reconstructed signals of the selected channel on a real-time basis.

6. The apparatus as defined in claim 5, wherein said first means for selecting, receiving, demultiplexing, storing, decompressing and displaying are disposed remotely from said second means for selecting, receiving, demultiplexing, storing, decompressing and displaying.

7. The apparatus as defined in claim 5, wherein said first and second carrier frequencies are selected so as to avoid undesirable interference between the feedback signals and the transmitted signals.

* * * * *